Jan. 7, 1941.  W. F. JAMISON  2,227,857
RING INSERTER
Filed April 27, 1938
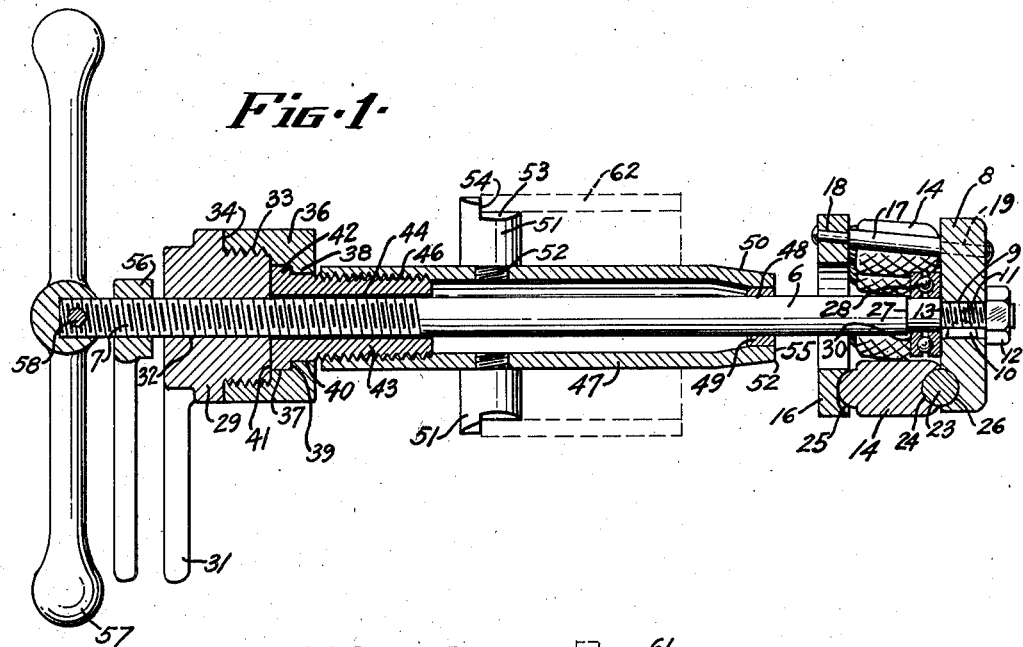
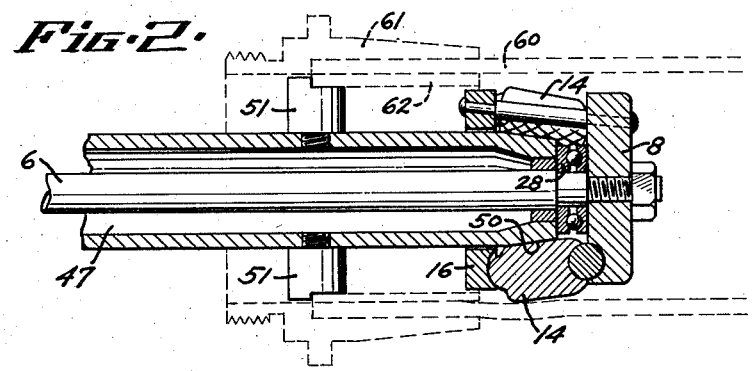
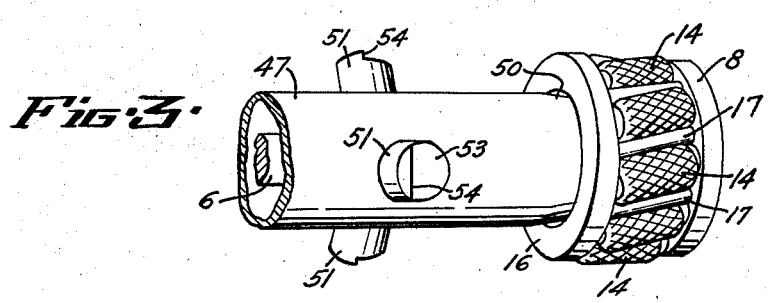
INVENTOR.
WILLIAM F. JAMISON
BY A. Durham Oliver
ATTORNEY.

Patented Jan. 7, 1941

2,227,857

UNITED STATES PATENT OFFICE 2,227,857

RING INSERTER

William F. Jamison, Santa Barbara, Calif.

Application April 27, 1938, Serial No. 204,583

4 Claims. (Cl. 29—88.2)

My invention relates to mechanism for inserting rings in hollow resilient objects.

One application for my invention is in the repair of damaged fire hose. After removing the damaged portion, it becomes necessary to insert the new end of the fire hose into the standard fire hose coupling, and then in order to retain the hose tightly within the coupling it is necessary to force into the inner side of the hose a brass ring which, after being placed within the hose, is then expanded tightly against the inner side of the hose.

The object of my invention is to provide a mechanical device for quickly and easily inserting a ring within the end of a hose.

Another object of my invention is to provide a ring inserting mechanism which functions by its connection to the hose alone and without any external lonigtudinal forcing means.

It is also an object of my invention to draw the device into the hose by means of grip rollers which roll on a spiral on the inner surface of the hose.

Another object of my invention is to provide a device for inserting the ring which will expand the hose away from the leading edge of the ring as the ring is drawn into the hose.

A further object of my invention is to arrange a device with rollers radially adjustable so that the rollers may be freely inserted or withdrawn from the hose as desired.

A further object of my invention is to provide a device which will accomplish its purpose speedily and expeditiously without the exercise of professional skill or damage to hose or couplings.

The above objects are accomplished by a mechanism having a frame with a plurality of traction rollers, set at an angle to the axis of the hose and adapted to be expanded into contact with the latter. Thus, upon rotation of the frame, a ring secured to the frame is pulled into the end of the hose coincident with the inward travel of the traction rollers.

In the drawing:

Fig. 1 is a longitudinal section of the device when not in use;

Fig. 2 is a longitudinal section of a portion of the device at the completion of an inserting operation; and Fig. 3 is a perspective view of a portion of the device.

The drawing illustrates a preferred embodiment of my invention, in which a shaft 6 has a threaded portion 7 of a length suitably adapted to the operation of the device. A disc 8 has a hole 9 at its center through which the short threaded portion 11 of shaft 6 extends. The nut 12 holds disc 8 rigidly in place on shaft 6 against the shoulder 13. A key such as 10 may be used to more firmly secure disc 8 from turning on shaft 6.

Knurled grip rollers 14 are mounted for rotation about their longitudinal axes between the disc 8 and a ring 16. The ring 16 is rigidly supported a suitable distance from disc 8 to contain the rollers 14 therebetween by spacers 17. Greater rigidity and strength may be obtained by providing a spacer 17 between each successive roller 14. The ring 16 may be rigidly supported on the spacers 17 by passing the ends of the spacers through holes such as 18 and 19 near the periphery of the ring 16 and disc 8 respectively to which they are riveted.

The rollers 14 have their leading or forward ends rotatively supported in the disc 8 near its periphery at a fixed distance from the axis of the shaft 6. A desirable way to accomplish this is by means of balls 23 seated in closely fitting sockets 26 in disc 8 and capped by the close fitting sockets 24 in the ends of rollers 14.

The trailing ends of the rollers 14, preferably spherical in shape, are adapted to rotate freely in the bearing grooves 25 and also to slide radially therein, being thereby outwardly adjustable with respect to the axis of the shaft 6. The length of grooves 25 is sufficient to allow the maximum desirable adjustment of rollers 14.

In order to accomplish one of their functions, the rollers 14 are disposed between the ring 16 and the disc 8 with their axes at all times tangent to a spiral whose axis coincides with the axis of the shaft 6. In other words, for the traction rollers to impart the necessary forward movement to the ring inserter, they must be mounted slightly askew. In this manner they feed their way inside the hose, pulling with them the whole mechanism.

In order that a suitable number of rollers 14 may be used it is desirable to arrange the spacers 17 so that their axes lie substantially parallel to the axes of the rollers 14.

A shoulder 27 on the shaft 6 provides a convenient retainer for a thrust bearing 28, the latter serving to leave the roller cage free for rotation around the spreader with the minimum of resistance.

On the threaded portion 7 of shaft 6 is a thrust nut 29 internally threaded through its center at 32 to receive the threads of the threaded portion 7 of the shaft 6 and adapted to be turned to any desired longitudinal adjustment thereon by handle 31.

Thrust nut 29 is also provided with a course of external threads 33 and a shoulder 34. A collar 36 having internal threads engaging threads 33 is screwed tightly against shoulder 34 and is thereby rigidly mounted on the thrust nut 29. The bushing 36 also has an inwardly extending flange 38.

A bushing 43 which is smooth bored through its center at 44 to slide and turn on shaft 6, extends through the flanged portion of collar 36. The bushing 43 having an outwardly extending flange 42 in engagement behind the flange 38 is thereby held against longitudinal movement along shaft 6 except by adjustment of thrust nut 29.

It is preferable to leave the bushing 43 freely rotatable on the shaft 6. For this purpose suitable bearing clearances are provided between the adjacent surfaces at 40, 39, 37 and 41.

A spreader 47, preferably tubular in form, is internally threaded at one end and is carried at that end by the bushing 43 being rigidly secured thereon by means of the tapering threads 46 or other suitable means. Spreader tube 47 is slidably and rotatably supported at its opposite end on shaft 6 as by a bushing 49.

The end of the spreader 47 is tapered at 50 to an angle which is preferably substantially tangent to the surfaces of the rollers 14 when in their outermost operative or gripping position.

The diameter of the spreader 47 at the tip 52 is such as to underlie the rollers 14 when the rollers are at their inmost position, thereby permitting entrance of the spreader beneath the ends of the rollers 14.

It is desirable to have end surface 55 of spreader 47 smooth and parallel with the surface 30 of the thrust bearing 28 so as to have full face contact therewith when spreader 47 is seated against bearing 28.

Intermediate the ends of spreader 47 are the studs 51 rigidly attached to tube 47 in any suitable manner as by a threaded portion 52 and preferably removable for repairs or change of size to accommodate various sizes or types of inserts. It is desirable that there be at least three of these studs, spaced equally around the spreader tube 47. The surfaces 53 of the studs 51 lie parallel to and equidistant from the axis of shaft 6 and may be cylindrical in form. Surfaces 54 are arranged radially and in a common plane perpendicular to the axis of shaft 6. The radial lengths of the surfaces 54 are preferably slightly less than the thickness of the insert which is to be installed in place by the device.

A lock nut 56 on threaded shaft portion 7 provides suitable means for locking the thrust nut 29 and spreader tube 47 in any desirable operative position.

A convenient handle 57 rigidly mounted as by a pin 58 on the end of the portion 7 of shaft 6 provides suitable means with which to rotate the device when inserting the ring in the hose.

As a means of describing the operation of the disclosed device, assume that it is desired to install a coupling on the end of a piece of fire hose.

The end of the hose 60 is first trimmed, then inserted in the coupling 61 (see Fig. 2). A metal insert or ring 62 is then placed within the hose and expanded to clamp the hose within the end of the coupling. The purpose of my device is to provide convenient and expedient mechanical means for placing the insert or ring 62 in the end of the hose prior to the expanding operation.

To use my device, adjust the parts to the position shown in Fig. 1. Pass the rollers 14 through the metal ring 62 to be inserted in the hose and move the ring back over the surfaces 53 of the studs 51 until the end of the ring is seated against the surfaces 54. Then introduce the device, roller end first, inside the end of the hose. Next expand the rollers 14 outward to the point where they grip the hose. This is accomplished by turning nut 29 by means of handle 31 in the proper direction to force the spreader 47 under rollers 14. Its tapered end 50 is adapted to swing the rollers outwardly in the radial slots 25 until they contact the inner walls of hose 60 with considerable pressure.

It is preferable that spreader 47 be inserted under rollers 14 until it seats against bearing 28. Then turn locking device 56 down tightly against nut 29. The device is now in proper operative adjustment.

As previously described, the rollers 14 are positioned between disc 8 and ring 16 with their longitudinal axes tangent to a spiral about shaft 6. Therefore, as the frame carrying rollers 14 is rotated by means of handle 57 on shaft 6, the device is drawn into the hose, forcing the insert 62 into place.

In the case of an elastic tube such as a hose, the rollers 14 are so arranged that when expanded within the hose they cause it to bulge so that near the leading end of the insert 62 the inside diameter of the hose is slightly greater than the outside diameter of the insert, with the result that the insert is provided free entry into the hose and is prevented from scraping it.

The desirability of a thrust bearing 28 interposed between disc 8 and the end surface 55 of the spreader 47 resides in the fact that as the device is rotated to draw the insert into a tube or hose, there will be rolling of the grip rollers 14 on the surface 50. Due to the angular setting of rollers 14, there will be axial sliding of the rollers on the tapered surface 50 in a direction tending to force the end 55 toward the disc 8. Under certain conditions the spreader 47 would be thrust against disc 8 with a pressure that might be destructive in the absence of proper lubrication. This danger is entirely eliminated and the device adapted to be more freely turned by use of the thrust bearing 28.

To remove the device after the insert 62 is in place, turn lock nut 56 away from thrust nut 29 to a position adjacent handle 57. Then turn the thrust nut 29 in the proper direction to withdraw the spreader 47 to a position clear of the rollers 14. The trailing end of the rollers 14 will then slide in the radial bearing grooves 25 toward the shaft 6, permitting them to pass through the insert 62 and enabling the operator to withdraw the device from the hose coupling.

It is hereby understood that the scope of my invention is broadly commensurate with the principle of operation of the device herein disclosed, which includes all the numerous modifications and equivalents of that which is claimed.

What I claim is:

1. A device for inserting a ring into a hollow tube, comprising a frame arranged to enter said tube, a plurality of feed rollers mounted on said frame adjacent the end thereof and at an angle to the axis of said tube, means for forcing said rollers outward into frictional engagement with said tube for feeding contact therewith, means for supporting a ring in axial alinement with said tube in fixed relation to said frame and back of said rollers, and means for rotating said frame whereby said angularly mounted rollers feed said frame axially with respect to said hollow tube.

2. A device for inserting a ring into a hollow tube having an internal diameter not greater than the outside diameter of said ring, comprising a frame arranged to slide axially within said tube, a plurality of feed rollers having two ends rotatably mounted askew on said frame adjacent the end thereof, the radial position of one end being fixed in said frame and the radial position of the other end being adjustable therein, means for forcing said adjustable ends radially outward into engagement with said tube for feeding contact therewith, means for supporting said ring in fixed axial relation with said frame adjacent the spread end of said rollers, and means for rotating said frame whereby said rollers feed said frame axially with respect to said hollow tube.

3. A device for inserting an annular ring into a hollow tube having an internal diameter substantially the same as the outside diameter of said ring, comprising a frame arranged to slide axially into said tube, a plurality of feed rollers journalled in said frame each having an end in fixed radial position and an end in adjustable radial position relative to said frame mounted askew on said frame adjacent the end thereof, means for forcing the adjustable end of said rollers outward into expansive feeding engagement with said tube, means for holding said ring in axial alinement with and adjacent said expanded roller ends, and means for rotating said device relative to said tube.

4. Means for inserting an annular ring into a hollow tube, comprising a frame arranged slidably to enter said tube axially, feed rollers mounted askew on said frame, each of said feed rollers having an end adjustable radially of said frame, means associated with said frame for supporting said annular ring in axial alinement with and adjacent said adjustable roller ends, means for forcing said adjustable roller ends outward into feeding contact with said hollow tube to describe a circle of diameter greater than that of said ring during rotation of said frame, each of said rollers then being tangent to a spiral about the axis of said frame, and means for rotating said frame.

WM. F. JAMISON.